US 8,049,462 B2

(12) United States Patent
Kung et al.

(10) Patent No.: US 8,049,462 B2
(45) Date of Patent: Nov. 1, 2011

(54) UNIVERSAL SERIAL BUS CHARGER CIRCUIT AND CHARGING METHOD

(75) Inventors: Nien-Hui Kung, HsinChu (TW);
Kwan-Jen Chu, HsinChu (TW);
Jing-Meng Liu, Jubei (TW)

(73) Assignee: Richtek Technology Corporation, R.O.C. (TW)

( * ) Notice: Subject to any disclaimer, the term of this patent is extended or adjusted under 35 U.S.C. 154(b) by 555 days.

(21) Appl. No.: 12/284,235

(22) Filed: Sep. 18, 2008

(65) Prior Publication Data
US 2009/0102431 A1 Apr. 23, 2009

(30) Foreign Application Priority Data

Oct. 19, 2007 (TW) .............................. 96139303 A

(51) Int. Cl.
*H02J 7/02* (2006.01)
(52) U.S. Cl. .......... 320/111; 320/133; 320/155; 320/137
(58) Field of Classification Search .................... 320/111
See application file for complete search history.

(56) References Cited

U.S. PATENT DOCUMENTS

| 5,500,584 | A | * | 3/1996 | Shimomoto | .................. 320/159 |
| 5,739,667 | A | * | 4/1998 | Matsuda et al. | .............. 320/128 |
| 2007/0188134 | A1 | * | 8/2007 | Hussain et al. | ............... 320/114 |
| 2007/0242300 | A1 | * | 10/2007 | Inai | .............................. 358/1.14 |

* cited by examiner

Primary Examiner — Arun Williams
(74) Attorney, Agent, or Firm — Tung & Associates

(57) ABSTRACT

The present invention discloses a universal serial bus (USB) charging circuit, comprising: a charging path for charging a battery from a USB host; a charging switch located on the charging path; a current sensing circuit for sensing current information on the charging path; a maximum available current detection circuit for detecting the maximum available current from the USB host; and a loop controller circuit for controlling the charging switch so that the charging current on the charging path is substantially equal to the maximum available current detected by the maximum available current detection circuit, wherein the maximum available current detection circuit detects the maximum available current during circuit initialization and stores it.

12 Claims, 4 Drawing Sheets

UNIVERSAL SERIAL BUS CHARGER CIRCUIT AND CHARGING METHOD

BACKGROUND OF THE INVENTION

1. Field of Invention

The present invention relates to a universal serial bus (USB) charging circuit and a charging method, in particular to a USB charging circuit having a simpler circuit structure and providing better protection to other peripheral devices connecting with the USB host, and a charging method.

2. Description of Related Art

In current state of the art, a USB does not only provide signal transmission but is also capable of providing power, e.g., to charge a mobile phone. However, because a USB host is usually dynamically connected with multiple different devices, its load varies dynamically; it is therefore preferred that a USB host provides a charging current which changes according to the load, instead of providing a constant current.

US patent publication No. 2006/0033474 discloses a USB charging circuit which provides a charging current that changes according to the load. A simplified form of this conventional circuit is shown in FIG. 1, in which the charging circuit 1 includes a transistor 11 operating as a charging switch, to charge a battery 10 from a voltage node Vbus at the USB host. A loop control circuit 12 controls the transistor 11 to determine its conduction, i.e., the current charging the battery 10. The loop control circuit 12 determines the charging current according to a current sense signal obtained from the path A, a voltage signal obtained by dividing the voltage at the node Vbus, and an upper limit set by a current setting circuit 14; the upper limit may be decided by an external input. The loop control circuit 12 also obtains the voltage of the battery 10 from the node B, and decides whether to switch the charging mode depending on whether the voltage at the node B reaches a predetermined level. An error amplifier 16 compares the dividend voltage from the node Vbus with a reference voltage Vref, to determine the difference between the voltage at the node Vbus and a preset minimum voltage. The conventional circuit is characterized by a compensation circuit 18, and a charge reduction loop 20 formed among the location for sensing current, the resistor R1, the parallel circuit of the compensation circuit 18 and the error amplifier 16, and the summation circuit 19. When the charging current is too high such that the voltage at the node Vbus drops below the preset minimum voltage, the charge reduction loop 20 functions to bring the voltage at the node Vbus back to or above the preset minimum voltage. In other words, this conventional circuit provides current as largest as possible to charge the battery 10 from the node Vbus, while maintaining the voltage at the node Vbus above the preset minimum voltage.

Although this conventional circuit might provide a charging current as largest as possible, it has the following drawbacks: first, it has a complicated circuit structure because it needs to constantly detect the voltage variation at the node Vbus; second, at an instance when the charging current is too high that the voltage at the node Vbus drops below the preset minimum voltage, a peripheral device which is connected with the USB host may be adversely affected, suffering data loss if data is being transmitted from/to the device.

In view of the foregoing drawbacks in the prior art, it is desired to provide a USB charging circuit having a simpler circuit structure and providing better protection to other peripheral devices connecting with the USB host, and a charging method.

SUMMARY OF THE INVENTION

A first objective of the present invention is to provide a USB charging circuit.

A second objective of the present invention is to provide a USB charging method.

In accordance with the foregoing and other objectives of the present invention, and from one aspect of the present invention, a USB charging circuit comprises: a charging path for charging a battery from a USB host; a charging switch located on the charging path; a current sensing circuit for sensing current information on the charging path; a maximum available current detection circuit for detecting the maximum available current from the USB host; and a loop controller circuit for controlling the charging switch so that the charging current on the charging path is substantially equal to the maximum available current detected by the maximum available current detection circuit, wherein the maximum available current detection circuit detects the maximum available current during circuit initialization and stores it.

From another aspect of the present invention, a USB charging method comprises: providing a charging circuit, which includes a charging path for charging a battery from a USB host; detecting the maximum available current from the USB host during circuit initialization and stores it; and making a charging current on the charging path equal to the stored maximum available current.

In the above circuit and method, when the charging current is higher than that the USB host can supply, preferably, the USB charging circuit is automatically shut down and rebooted.

In the above circuit and method, preferably, the USB charging circuit is periodically shut down and rebooted.

In the above circuit and method, preferably, the charging current is periodically lifted up to a predetermined upper limit.

It is to be understood that both the foregoing general description and the following detailed description are provided as examples, for illustration but not for limiting the scope of the invention.

BRIEF DESCRIPTION OF THE DRAWINGS

These and other features, aspects, and advantages of the present invention will become better understood with regard to the following description, appended claims, and accompanying drawings.

DESCRIPTION OF THE PREFERRED EMBODIMENTS

In the present invention, it is not required to compare a dividend voltage of the voltage at the node Vbus with a reference voltage to decide whether it is higher than a preset minimum voltage; neither is a compensation circuit required.

Figure 1:
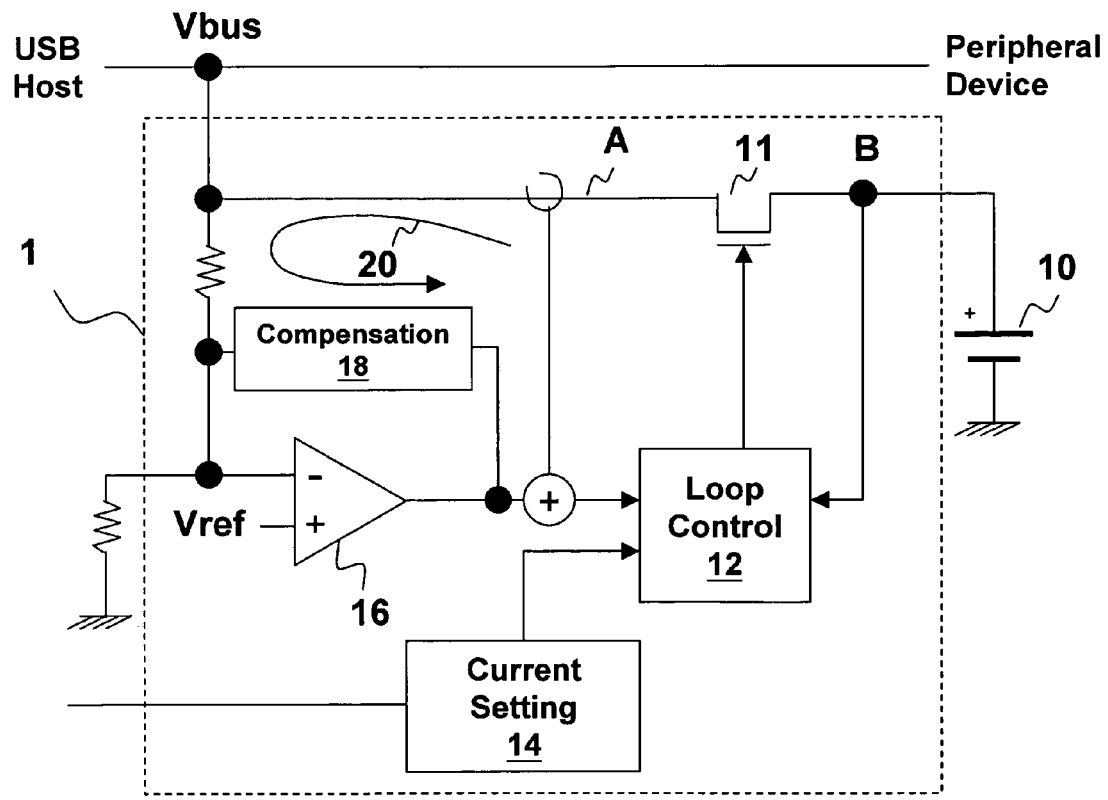
FIG. 1 is a schematic circuit diagram showing a conventional USB charging circuit.
Figure 2:
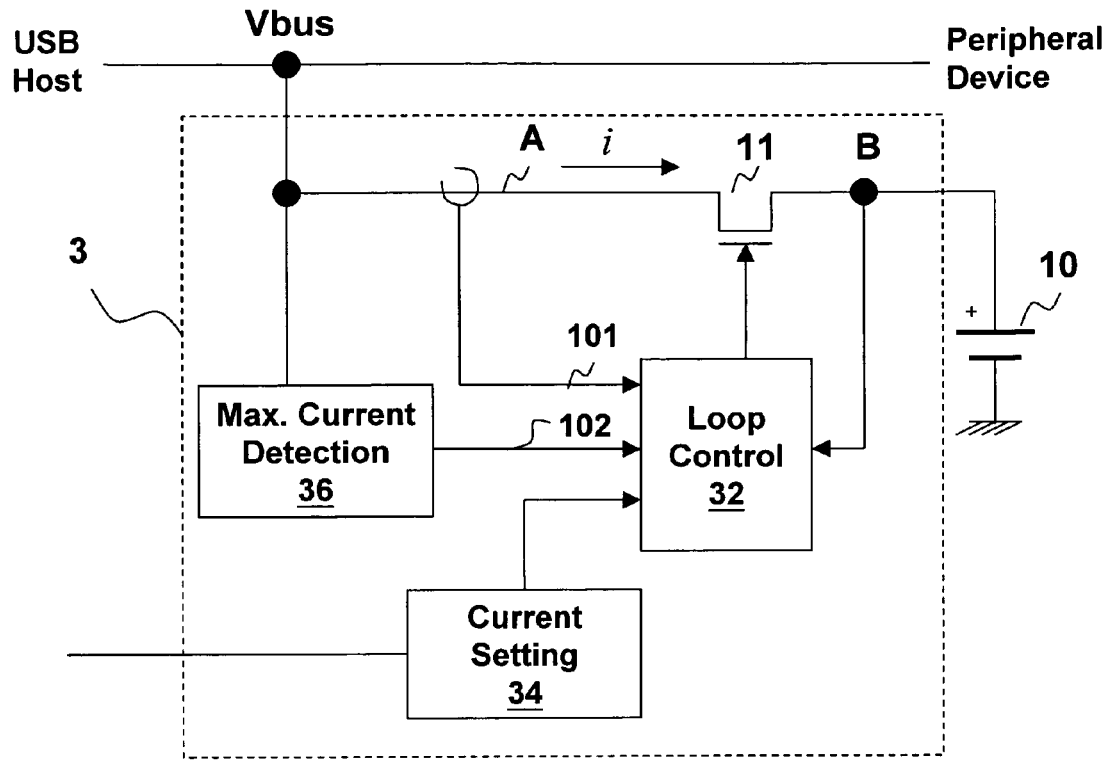
FIG. 2 is a circuit diagram showing a first embodiment of the present invention.

Referring to the first embodiment of FIG. 2, the present invention includes, in addition to a charging switch 11, a loop control circuit 32 controlling the charging 6y6jhyh-switch 11, and a current setting circuit 34 for externally setting the upper limit of the charging current, only a maximum current detection circuit 36. The function of the maximum current detection circuit 36 is to detect and store the value of the maximum available charging current (the maximum current that the USB host can supply) when the USB charging circuit 3 is initialized. The value of the maximum available charging current may be stored in various ways, such as by sample-and-hold method. After determining the maximum available charging current, the USB charging circuit 3 keeps charging with this current. This may be done by, for example, comparing the signals 101 and 102 by an error amplifier (not shown) in the loop control circuit 32, and keeping the signals 101 and 102 about the same as each other by feedback mechanism.

Figure 3:
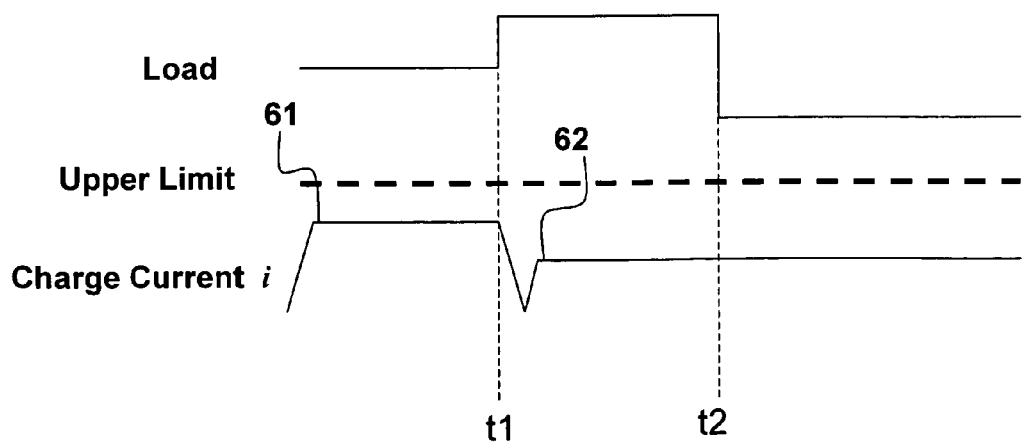
FIG. 3 shows a charging waveform of the circuit of FIG. 2.

Referring to FIG. 3, the circuit of this embodiment charges the battery in the manner as described below. Assuming that the load of the USB host is shown as the first waveform, and the upper limit of the charging current is externally set as the dash line, when the USB charging circuit 3 is initialized, the maximum current detection circuit 36 detects a maximum available charging current 61, and the USB charging circuit 3 keeps charging the battery with this current. At time t1, the load changes which decreases the current that the USB host can supply, and thus the current 61 is no more what the USB host can afford to supply; at this instance, the USB charging circuit 3 automatically shuts down and reboots, to detect and update the maximum available charging current by the maximum current detection circuit 36, and charges the battery according to the updated maximum available charging current 62. At time t2, the load again changes, but this time it becomes lighter; however, this change does not affect the charging current of the USB charging circuit 3.

The above embodiment has the following merits: first, the circuit structure is simple. Second, every time when the USB charging circuit 3 consumes a current larger than what the USB host can afford, the USB charging circuit 3 shuts down itself first, so that the other peripheral devices in connection with the USB host will not be adversely affected. When there are multiple devices sharing power from the USB host, because a charging circuit does not involve data transmission, it is the safest arrangement to shut down and adjust the current consumption of the USB charging circuit 3 as a first priority than to lower the current supplied to the other devices which may involve data transmission.

Figure 4:
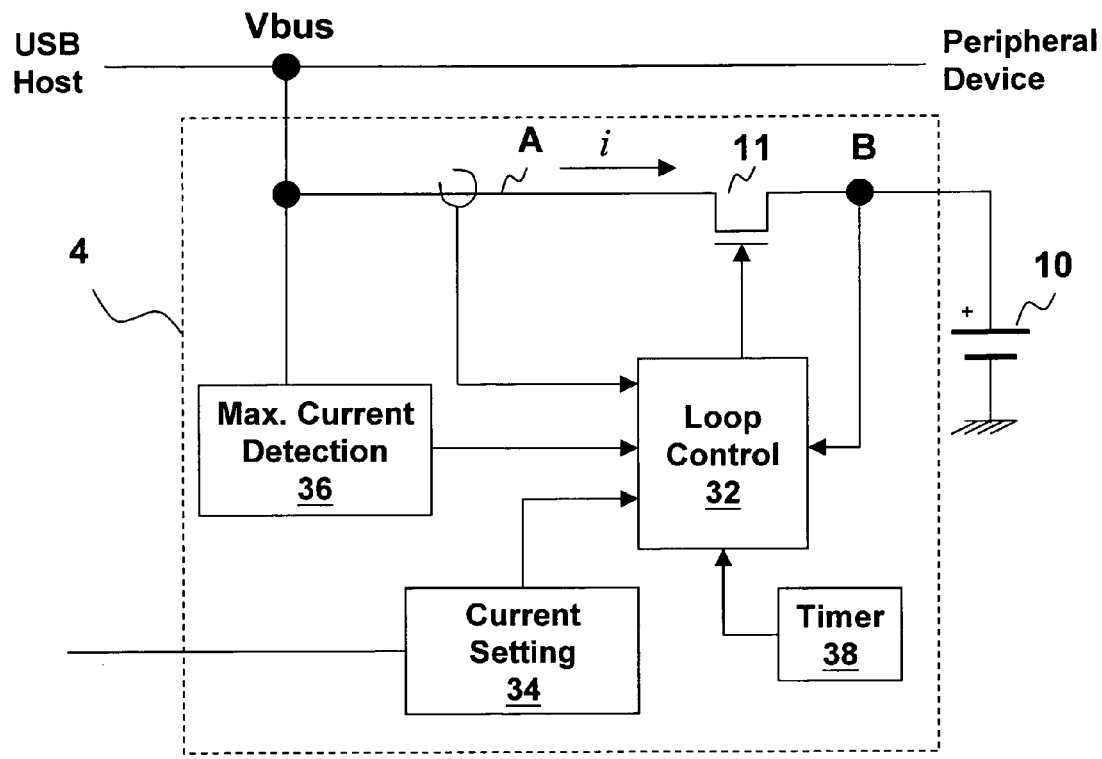
FIG. 4 is a circuit diagram showing a second embodiment of the present invention.
Figure 5:
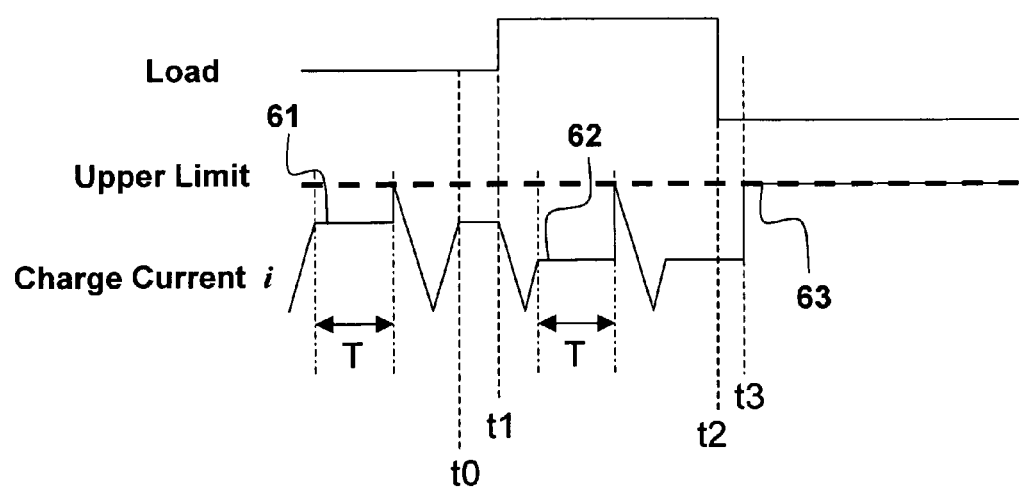
FIG. 5 shows a charging waveform of the circuit of FIG. 4.

FIG. 4 shows a schematic diagram of another embodiment according to the present invention. As shown in the figure, The USB charging circuit 4 includes, in addition to a charging switch 11, a loop control circuit 32, a current setting circuit 34 and a maximum current detection circuit 36, a timer 38. Referring to FIG. 5, the timer 38 counts a time period T, and as it is reached, the loop control circuit 32 controls the charging switch 11 to increase the charging current i to the upper limit set by the current setting circuit. Because the charging current i at the upper limit is larger than what the USB host can afford, the USB charging circuit 4 automatically shuts down and reboots. After it is rebooted, the maximum current detection circuit 36 detects the maximum available charging current and sets the charging current i at the detected value 61 (time t0). At time t1, similar to the previous embodiment, the load changes which decreases the current that the USB host can supply, and thus the current 61 exceeds what the USB host can afford to supply; at this instance, the USB charging circuit 4 automatically shuts down and reboots, to detect and update the maximum available charging current by the maximum current detection circuit 36, and charges the battery according to the updated maximum available charging current 62. Thereafter, according to the signal from the timer 38, the USB charging circuit 4 periodically shuts down and reboots, and the maximum available charging current is still the current 62. At time t2, the load changes and becomes lighter; at time t3, the maximum current detection circuit 36 lifts the charging current i to the upper limit, but this is what the USB host can afford, so the USB charging circuit 4 charges the battery with this current, until the next time the timer 38 counts the time T, or when the load becomes heavier.

In comparison with the previous embodiment, the USB charging circuit 4 of this embodiment increases the charging current when the current that the USB host can afford increases.

Figure 6:
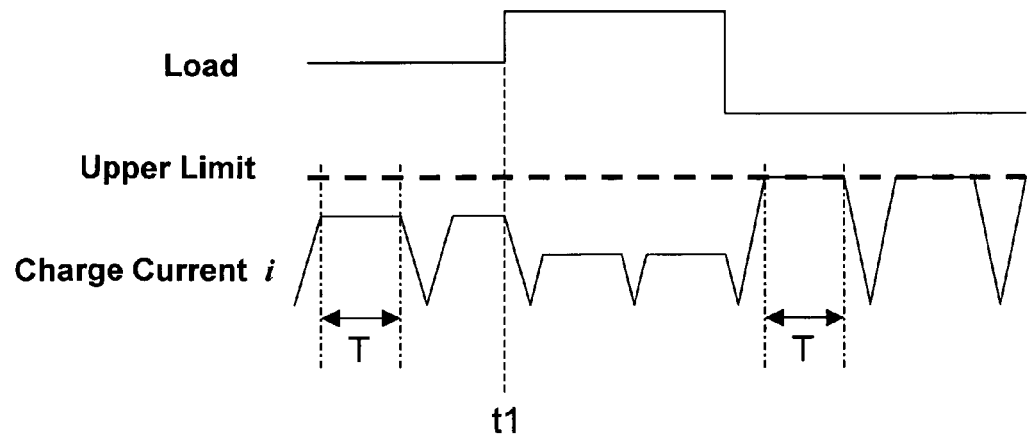
FIG. 6 shows another charging waveform of the circuit of FIG. 4.

With the same circuit of FIG. 4, FIG. 6 shows another charging method. This method does not lifts the charging current to the upper limit, but periodically shuts down the reboots the USB charging circuit 4 (and also reboots the USB charging circuit 4 at time t1). In comparison with the method shown in FIG. 5, this method would less affect the other peripheral devices sharing the power from the USB host.

Figure 7:
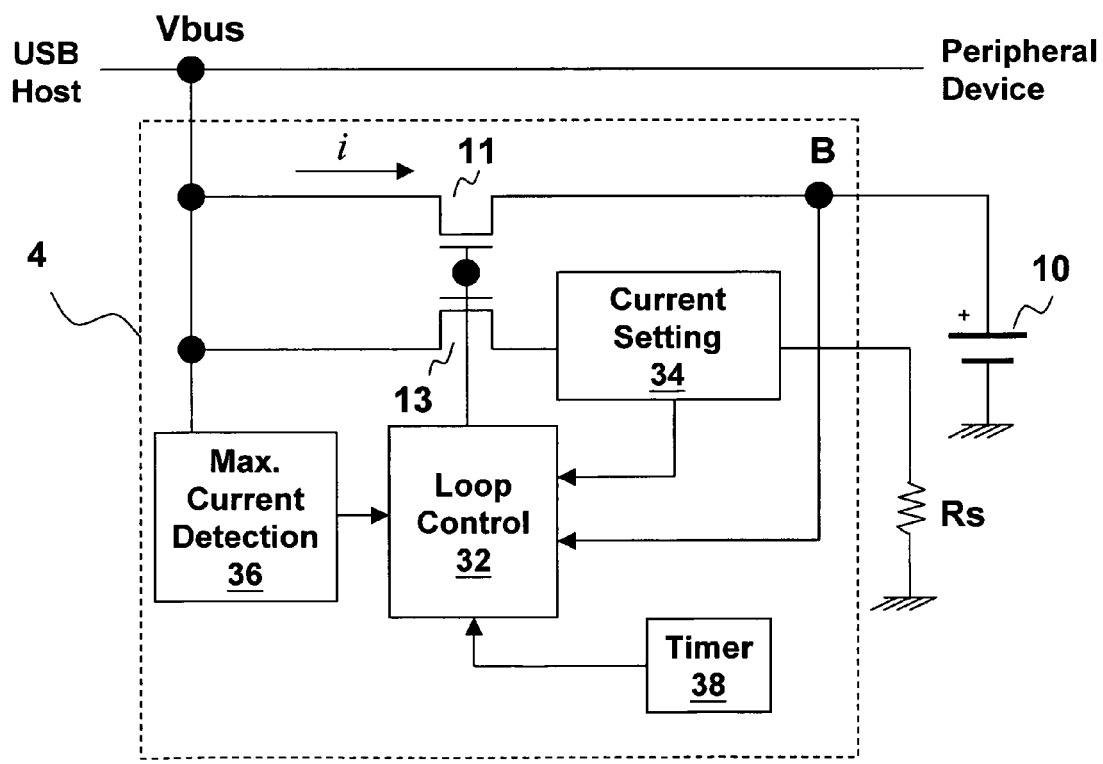
FIG. 7 is a schematic circuit diagram showing more details of the circuit of FIG. 4.

By way of example, FIG. 7 shows an embodiment as to how to obtain current information from the charging path and to set the current upper limit. The current information on the charging path may be obtained by providing a transistor 13, taking the matching ratio between the transistor 13 and the transistor 11 into consideration. The upper limit may be set by adjusting the resistance of the resistor Rs. In addition to what is shown in FIG. 7, there are various ways to achieve the same functions, as one can readily think of under the teaching of the present invention.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a circuit device may be inserted between two circuit devices shown to be in direct connection in the embodiments, without affecting the primary function of the charging circuit. In view of the foregoing, it is intended that the present invention cover all such and other modifications and variations, which should be interpreted to fall within the scope of the following claims and their equivalents.

What is claimed is:

1. A universal serial bus (USB) charging circuit, comprising:
a charging path for charging a battery from a USB host;
a charging switch located on the charging path;
a current sensing circuit for sensing current information on the charging path;
a maximum available current detection circuit for detecting a maximum available current from the USB host; and
a loop controller circuit for controlling the charging switch so that the charging current on the charging path is substantially equal to the maximum available current detected by the maximum available current detection circuit,
wherein the maximum available current detection circuit detects the maximum available current during only circuit initialization and circuit rebooting, and stores the maximum available current, and wherein when the charging current is higher than that the USB host can supply, the USB charging circuit is automatically shut down and rebooted, and the maximum available current is updated according to a detected condition during circuit rebooting.

2. The USB charging circuit of claim 1, further comprising a current setting circuit for setting an upper limit of the charging current.

3. A universal serial bus (USB) charging circuit, comprising:
a charging path for charging a battery from a USB host;
a charging switch located on the charging path;
a current sensing circuit for sensing current information on the charging path;
a maximum available current detection circuit for detecting a maximum available current from the USB host; and
a loop controller circuit for controlling the charging switch so that the charging current on the charging path is substantially equal to the maximum available current detected by the maximum available current detection circuit,
wherein the maximum available current detection circuit detects the maximum available current during only circuit initialization and circuit rebooting, and stores the maximum available current, and wherein the USB charging circuit is periodically shut down and rebooted, and the maximum available current is updated according to a detected condition during circuit rebooting.

4. The USB charging circuit of claim 3, further comprising a current setting circuit for setting an upper limit of the charging current.

5. The USB charging circuit of claim 3, further comprising a timer for periodically providing time information to the loop control circuit, wherein the loop control circuit periodically lifts the charging current to the upper limit when the battery is charged by the maximum available current for a time exceeding a preset time counted by the timer.

6. The USB charging circuit of claim 3, wherein the loop control circuit obtains information of the battery voltage from one end of the battery.

7. A USB charging method comprising:
providing a charging circuit, which includes a charging path for charging a battery from a USB host;
detecting a maximum available current from the USB host during only circuit initialization and circuit rebooting and stores the maximum available current;
making a charging current on the charging path equal to the stored maximum available current;
when the charging current is higher than that the USB host can supply, automatically shutting down and rebooting the USB charging circuit; and
updating the maximum available current according to a detected condition during circuit rebooting.

8. The USB charging method of claim 7, further comprising: setting an upper limit for the charging current.

9. A USB charging method comprising:
providing a charging circuit, which includes a charging path for charging a battery from a USB host;
detecting a maximum available current from the USB host during only circuit initialization and circuit rebooting and stores the maximum available current;
making a charging current on the charging path equal to the stored maximum available current;
periodically shutting down and rebooting the USB charging circuit; and
updating the maximum available current according to a detected condition during circuit.

10. The USB charging method of claim 9, further comprising: setting an upper limit for the charging current.

11. The USB charging method of claim 10, further comprising: periodically lifting the charging current to the upper limit when the battery is charged by the maximum available current for a predetermined time period.

12. The USB charging method of claim 9, further comprising: obtaining information of the battery voltage from one end of the battery.

* * * * *